Patented Oct. 3, 1950

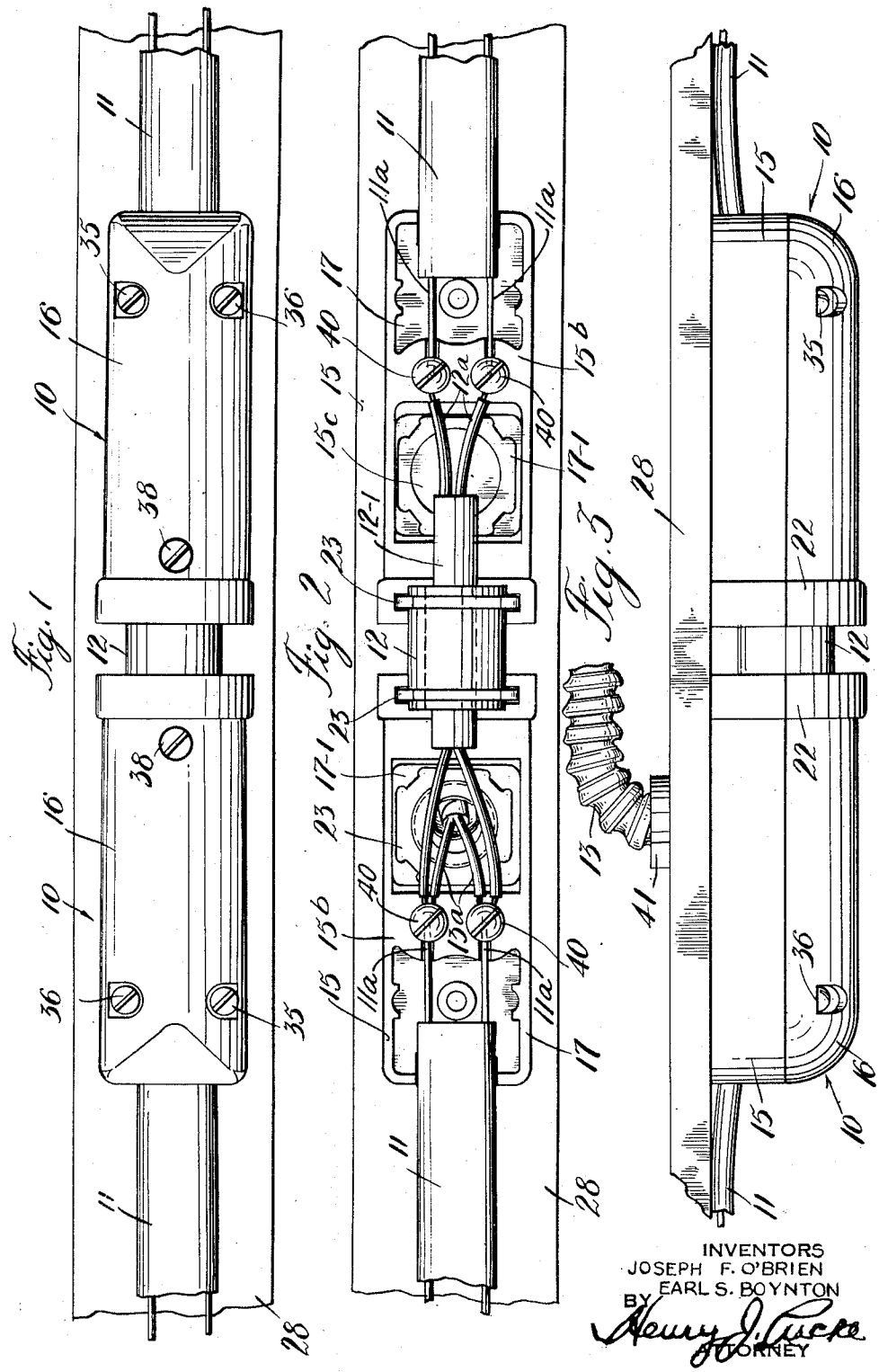
Oct. 3, 1950 — J. F. O'BRIEN ET AL — 2,524,071
FEED UNIT FOR ELECTRICAL WIRING SYSTEMS
Filed March 29, 1946 — 3 Sheets-Sheet 1
INVENTORS
JOSEPH F. O'BRIEN
EARL S. BOYNTON

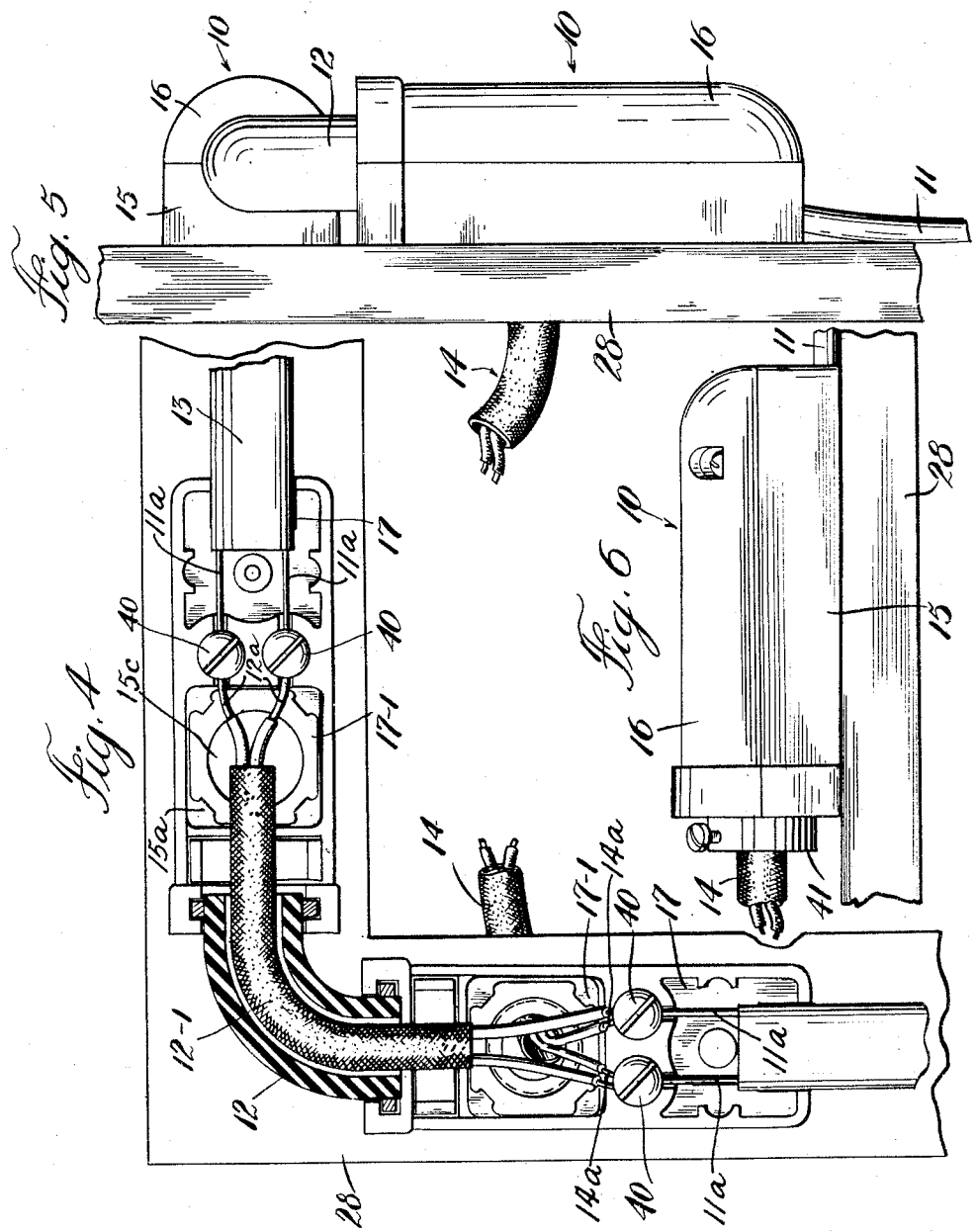

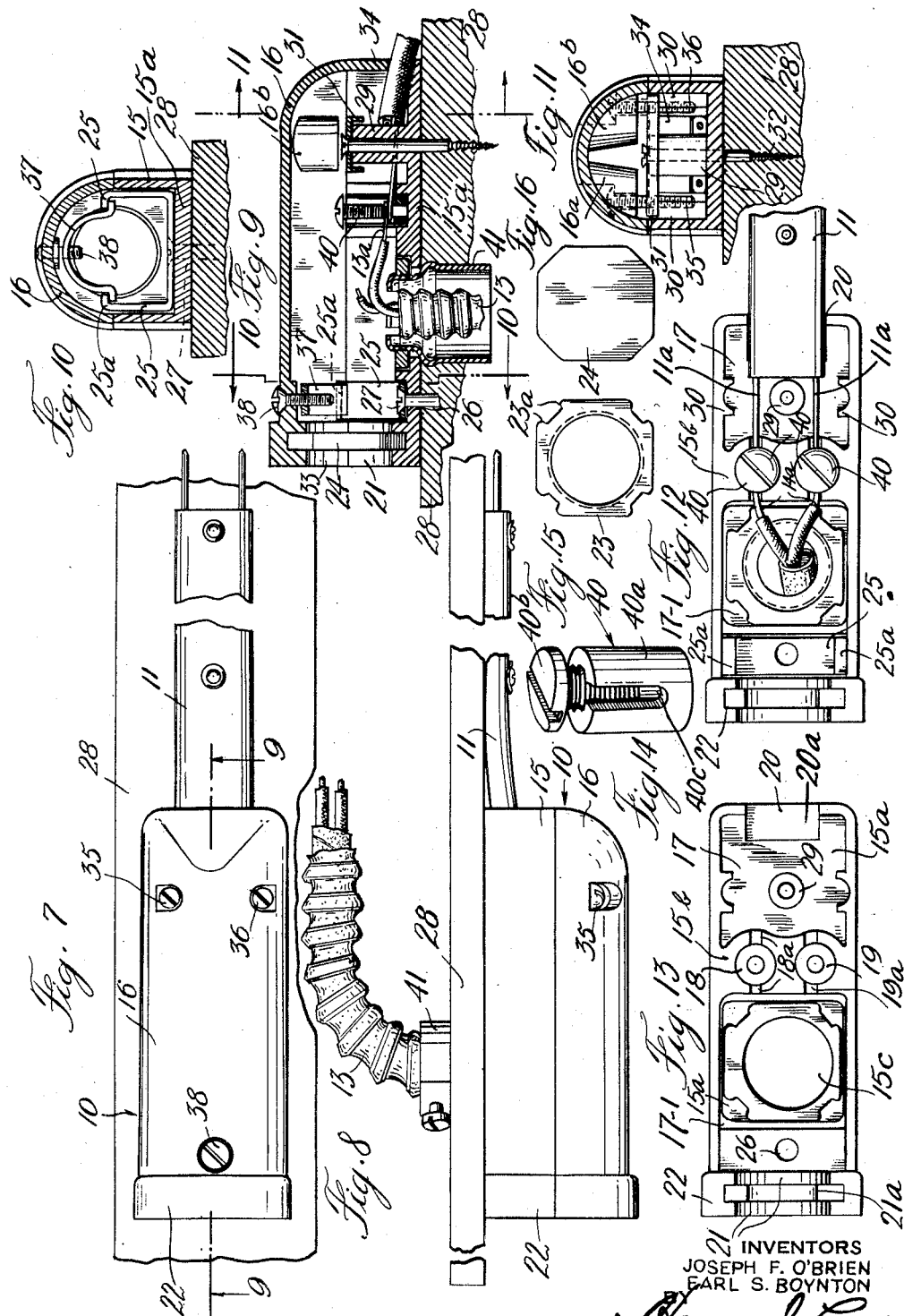

2,524,071

UNITED STATES PATENT OFFICE 2,524,071

FEED UNIT FOR ELECTRICAL WIRING SYSTEMS

Joseph F. O'Brien, Lebanon, and Earl S. Boynton, East Orange, N. J., assignors to John B. Pierce Foundation, New York, N. Y., a corporation of New York Application March 29, 1946, Serial No. 658,052

2 Claims. (Cl. 174—59)

The invention relates to feed units for electrical wiring systems.

More particularly, the invention relates to devices employed in electrical wiring systems, composed of preformed units for ready interconnection with other units. The interconnected component units of such systems are usually supported along exposed wall surfaces, where they are conveniently accessible during installation and for possible future repair or change.

The particular type of wiring device to which the invention is directed is generally known as a "feed" section or unit, and serves to connect the system as a whole with the source of electrical supply.

Among the objects of the invention are:

To provide an improved feed unit for an electric wiring system;

To provide a feed unit which permits the introduction of power source conductors thereinto at a plurality of optional locations;

To provide a feed unit which may be used as a common feed junction for a plurality of wiring systems;

To provide a feed unit which may serve as the end section of a wiring system of interconnected unit sections;

To provide a feed unit which may serve as an end section of a wiring system for interconnection with a similar feed unit of a second wiring system, whereby a plurality of individual wiring systems may be mutually interconnected and served from a common source of electric power;

To provide a feed unit which is simple in construction and easily and economically fabricated;

To provide a feed unit especially suitable for use with the flat type of composite electrical wiring conductor strip described and claimed in our co-pending application Serial No. 652,598, filed March 7, 1946, now Patent No. 2,495,280, entitled "Composite Electrical Conductor Strips," and with other generally similar types of electric wiring conductor strips.

Further features of the invention reside in the arrangement of the binding post structure and in the housing of the feed unit, whereby positive electrical connection and mechanical stability is assured between it and the interconnecting electrical wiring conductor strip.

Other objects and features of the invention will be apparent from the following detailed description of preferred specific embodiments illustrated in the accompanying drawings.

In the drawings:

Fig. 1 represents a front elevation of a fragmentary portion of a surface wiring system embodying flat type electrical conductor strips and two interconnected, mutually similar feed units of the invention;

Fig. 2 is a view similar to that of Fig. 1, but with the cover parts of the two feed units removed, revealing the interior structure and the electrical connections;

Fig. 3 is a top plan view of the structure illustrated in Fig. 1;

Fig. 4 is a view similar to that of Fig. 2, but illustrating the two feed units as disposed and interconnected at right angles;

Fig. 5 is a left side elevation of the structure shown in Fig. 4 with cover parts of the feed units in place;

Fig. 6 is a side elevation of a feed unit similar to the feed units illustrated in the foregoing figures, but showing the power source cable entering an end of the unit rather than through the base of the unit, i. e., the wall of the unit which lies against the supporting surface;

Fig. 7 is a view similar to that of Fig. 1, but illustrating a system wherein the feed unit forms an end section of the wiring system;

Fig. 8 is a top plan view of the structure illustrated in Fig. 7;

Fig. 9 is a longitudinal sectional view taken on the line 9—9 of Fig. 7;

Fig. 10 is a transverse sectional view taken on line 10—10 of Fig. 9;

Fig. 11 is a transverse sectional view taken on line 11—11 of Fig. 9;

Fig. 12 is a plan view of the interior of the feed unit of Fig. 7, showing electrical connections, the cover part of the housing having been removed;

Fig. 13 is a plan view similar to Fig. 12, and illustrates the interior of the body part of the housing per se and the separable binding posts, the interconnecting electrical wiring having been removed;

Fig. 14 is a detail perspective view on an enlarged scale of a binding post of the feed unit;

Fig. 15 is a detail plan view of a securing nut employed in the feed unit; and

Fig. 16 is a detail view of a closure blank employed in the feed unit.

Referring now to the preferred embodiments illustrated in the drawings, the feed unit of the invention, designated generally 10, is shown as a component of a surface wiring system employing electrical wiring conductor strips 11 of flat type, such as that illustrated, described and claimed in our copending application Serial No. 652,598, filed March 7, 1946, and entitled "Composite Electrical Conductor Strips."

A wiring system arranged as a closed loop circuit may be conveniently connected to a power source cable by the use of two feed units 10, shown disposed end to end and interconnected by a short jumper cable section 12, as illustrated in Figs. 1 through 5, only one of the units in this instance connecting directly with the power source cable, for example, the metal sheathed BX cable 13, Fig. 3, or the ordinary, heavily insulated cable 14, Fig. 4.

A single run of wiring conductor strip may be connected to a single feed unit 10, see Figs. 6 through 9, which serves both as a means for connecting the strip with a power source cable and as a closed end section for the run.

Such feed unit 10, whether employed in duplicate in association with a closed loop circuit or singly in association with a utility run of wiring strip, comprises preferably a two-part housing, advantageously molded of a plastic material possessing the desired insulating properties, typified by phenol resin plastics. A body part 15 serves as the main receiving and retaining portion of the housing, and a cover part 16 coacts therewith.

The housing body part 15, see especially Fig. 13, is recessed along its length, having a floor 15a and side and end walls rising therefrom. Intermediate the length thereof a transverse wall or partition 15b, preferably integral with the floor and side walls, as shown, divides the lengthwise recess into two receiving chambers 17 and 17—1. The transverse wall or partition is thick, and is insulating in character. Into its body is formed a plurality of relatively deep holes, in number corresponding to the number of electrical conductors comprised in the system, these holes serving to removably receive and retain electrical binding posts. Since a two-conductor system is illustrated in each instance, the feed unit 10 is shown as having two deep recesses 18 and 19 formed into its transverse wall or partition 15b. Also formed into the transverse wall or partition, though not so deeply, are passages 18a and 19a to accommodate the wiring leads; they interconnect the two chambers 17 and 17—1.

Both end walls of the housing part 15 are channeled, one for receiving an end of the electrical conductor wiring strip 11, and the other for receiving either a power source cable or jumper cable, or a closure disk, depending upon the requirements of the individual installations. The channel 20 is rectangular in configuration and extends slightly below the floor level, from where a ramp 20a leads inward of the chamber 17. The wiring strip 11 enters the feed unit at this location, lying on the ramp 20a and extending well within the chamber 17, see Fig. 12. The other channel 21 coordinates with the socket end formation 22, Figs. 1, 3, 5, 6, 7 and 8, and is therefore, semi-circular in configuration, having what may be termed a concentrically countersunk midportion 21a for receiving an insert, either an internally threaded nut 23, as illustrated per se in Fig. 15, or an insulating closure blank 24, shown in Fig. 16. It is stated that since it is desired that the unit be anchored against turning, the countersunk channel portion 21a is contoured as a bed for receiving the nut's anchoring projections 23a.

Within the confines of chamber 17—1 the floor 15a of the housing body part has formed therein sunken areas, of formation conforming with certain insert parts of the feed unit.

One of these insert parts is a nut 23, which may or may not serve a useful purpose, depending upon whether or not the power source cable is led into the unit therethrough. It will be observed that the floor 15a is thinner throughout a circular portion 15c of diameter approximating the inner diameter of the nut 23 than it is elsewhere, giving rise to a disc knock-out which can be conveniently broken out when entry of the power source cable is desired at that location, as shown in Fig. 12.

The other insert part is a securing piece 25, see Fig. 12, advantageously a metal stamping of U-shaped formation having inturned flanges 25a, for a purpose hereinafter referred to, and a screw hole in its bottom aligned with a corresponding screw hole 26 formed in the body part bottom, see Fig. 13, for enabling an ordinary wood screw 27, see Fig. 9, to secure the body part to a baseboard 28 or like supporting member.

For securing purposes, at the opposite end of the housing body part are a post 29, see Fig. 11, which rises desirably integrally from the floor 15a, and concave screw-receiving formations 30, which extend desirably integrally from the side walls adjacent thereto. These members, namely the post 29 and the side formations 30, provide support for a bridge element 31, preferably a metal stamping. Aligned screw-receiving holes extend centrally through the bridge element 31 and post 29 and an ordinary wood screw 32 may be employed to secure both the bridge element to the post and the housing body part 15 to the baseboard 28.

The cover part 16 of the feed unit housing is formed to fit tightly over the body part 15, and to coact therewith in defining the desired socket end 22 for the reception and securement of either a power source cable 13 or 14 or of the closure blank 24. It is formed, further, to close the channel opening 20 above the wiring strip 11.

For the above purposes the cover part 16 possesses a semi-circularly channeled end portion 33, see Fig. 9, which is similar to and cooperates with the channeled end portion 21 of the housing body part 15. Together they form the socket end 22 of the feed unit.

The opposite end portion of the cover part possesses an apron member 34, see Figs. 9 and 11, which fits into the channel 20 of the housing body part 15 and closes it off above the wiring strip 11.

For tightly fastening the cover part 16 in place over the body part 15 and thereby provide a closed protective housing pleasing to the eye, screws 35 and 36, see especially Fig. 11, are passed through holes provided in the bosses 16a and 16b, respectively, which extend inwardly of the cover part and are integral therewith, such screws engaging the threads of internally threaded holes formed in the opposite end portions of the bridge element 31. In addition, a yoke 37, see Fig. 9, has tip-end flanges arranged to engage under the inturned flanges 25a of the securing piece 25, and, when drawn upwardly by a screw 38, to lock therewith.

When incorporated in a wiring system, such as that illustrated in the drawings, the feed unit of the invention serves admirably to connect the electrical conductor wiring strip of the system with the power source cable. As can be seen from Figs. 2, 4, 9 and 12, the wiring strip 11 extends well within the chamber 17. The bared prong ends 11a of the conductor elements lie at opposite sides of the post 29 and extend on through portions of the passages 18a and 19a for electrical connection with the live wires 13a, Figs. 2 and 9, or live wire 14a, Figs. 4 and 12, of a power source cable 13 or 14, or with the wires 12a of a jumper cable 12—1, Fig. 2.

Electrical connection is effectively accomplished by means of binding posts 40 removably positioned within the deep recesses 18 and 19 of the housing body part 15. As illustrated in Fig. 14, a binding post 40 advantageously comprises an internally threaded tubular sleeve element 40a arranged to slide down into place within a deep recess 18 or 19, and a clamping screw 40b arranged to screw up and down on the internal threading of the sleeve element. The sleeve element 40a is cut deeply through the greater part of its length and completely across diametrically, providing a cradle 40c within which the electrical conductors and live wires engage one another and are clamped tightly together in electrical connection by the screw 40b.

The feed unit of the invention is versatile in its adaptation to varying conditions of use. As illustrated, in Figs. 1, 2 and 3, two of the units may be connected "back to back" mechanically by means of the tubular jumper element 12, the opposite threaded end portions of which are mechanically secured to the respective unit by the nuts 23, and electrically by means of the jumper cable 12—1, the wires 12a of which are clamped within the binding posts 18 and 19 of the respective units. By running the electricity conducting wiring strip 11 of a closed loop wiring system into the opposite receiving ends of the interconnected feed units and clamping their respective conductors in the binding posts of the respective units, either unit may be made the feed for the system. It is only necessary to break out the knock-out disc 15c in the floor of the particular unit chosen, here shown as the left hand unit, screw the power source cable adaptor fitting 41 in place in the nut 23, thereby establishing secure mechanical connections, and clamp the live wires of the power source cable in the binding posts.

An arrangement similar to the above may be employed also for two interconnected, single runs of wiring strip.

In instances where only one feed unit is employed, power source cable may be led thereinto through either the socket end portion 22 of the housing, as in Fig. 6, or through the floor thereof, as in Figs. 7 through 12. In both instances the alternative entry is effectively closed off, in the first by the closure blank 24, and in the second by the knock-out portion 15c.

Whereas this invention has been described with respect to certain preferred specific embodiments thereof, it should be understood that various changes may be made therein and that other embodiments may be developed without departing from the spirit and generic scope of the invention, as set forth herein and as defined by the claims which here follow.

We claim:

1. A feed unit for an electric wiring system comprising a housing consisting of a body part recessed along its length; a coacting cover part for substantially closing said recessed body part; and an integral transverse wall formed in said body part to divide the recess therein into two receiving chambers, said wall having therein a plurality of relatively deep holes and passages connecting each hole therein with each receiving chamber into which said body part is divided, said body part having a semi-circular channel formed in an end wall thereof for reception of a power source cable end extending into one of the receiving chambers therein, said body part also having a rectangular channel formed in the opposite end wall thereof for reception of a conductor wiring strip end extending into the other receiving chamber therein, said cover part having a semi-circular channel formed in one end wall thereof for coaction with the semi-circular channel in the end wall of said body part to surround closely and completely the power source cable end extending into said housing, said cover part also having at its opposite end wall an apron fitting into the rectangular channel in said body part to close said housing about the conductor wiring strip end extending into said housing; in combination with metallic binding posts in the deep holes in said transverse wall, each of said binding posts comprising an internally threaded sleeve element cut deeply across diametrically to register with the passages in said wall connecting the deep hole with each receiving chamber, and a clamping screw engaging the threads of said sleeve element to clamp together a conductor of the power source cable extending into one receiving chamber of said body part and a conductor of the conductor wiring strip extending into the other receiving chamber of said body part.

2. A feed unit for an electrical wiring system comprising a housing consisting of a body part recessed along its length; a coacting cover part for substantially closing said recessed body part; and an integral transverse wall formed in said body part to divide the recess therein into two receiving chambers, said wall having therein a plurality of relatively deep holes and passages connecting each hole therein with each receiving chamber into which said body part is divided, said body part having a semi-circular channel formed in an end wall thereof for reception of a power source cable and extending into one of the receiving chambers therein, the semi-circular channel formed in the cable-receiving end wall having therein a concentrically counter-sunk mid portion for reception of a cable-engaging nut and being contoured to prevent such nut from turning therein, said body part also having a rectangular channel formed in the opposite end wall thereof for reception of a conductor wiring strip and extending into the other receiving chamber therein, the rectangular channel in said body part being formed with a ramp leading inwardly to the adjacent receiving chamber therein, said cover part having a semi-circular channel formed in one end wall thereof like that in one end wall of said body part for coaction with the semi-circular channel in the end wall of said body part to surround closely and completely the power source cable end extending into said housing, said cover part also having at its opposite end wall an apron fitting into the rectangular channel in said body part to close said housing about the conductor wiring strip and extending into said housing; in combination with metallic binding posts in the deep holes in said transverse wall, each of said binding posts comprising an internally threaded sleeve element cut deeply across diametrically to register with the passages in said wall connecting the deep hole with each receiving chamber, and a clamping screw engaging the threads of said sleeve element to clamp together a conductor of the power source cable extending into one receiving chamber of said body part and a conductor of the conductor wiring strip extending into the other receiving chamber of said body part.

JOSEPH F. O'BRIEN.
EARL S. BOYNTON.

REFERENCES CITED

The following references are of record in the file of this patent:

UNITED STATES PATENTS

| Number | Name | Date |
|---|---|---|
| 710,787 | Lewis | Oct. 7, 1902 |
| 1,260,592 | Sturgeon | Mar. 26, 1918 |
| 1,777,530 | Pearson | Oct. 7, 1930 |
| 1,862,128 | Wermine | June 7, 1932 |
| 1,884,219 | Radack | Oct. 25, 1932 |
| 1,914,011 | Eccles | June 13, 1933 |
| 2,072,585 | Frank | Mar. 2, 1937 |
| 2,079,800 | Grant | May 11, 1937 |
| 2,119,066 | Abbott | May 31, 1938 |
| 2,411,018 | Benander | Nov. 12, 1946 |